(12) United States Patent
Moriya et al.

(10) Patent No.: US 6,725,448 B1
(45) Date of Patent: Apr. 20, 2004

(54) SYSTEM TO OPTIMALLY CREATE PARALLEL PROCESSES AND RECORDING MEDIUM

(75) Inventors: Katsuyoshi Moriya, Yaizu (JP); Katsumi Ichinose, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 09/715,178

(22) Filed: Nov. 20, 2000

(30) Foreign Application Priority Data

Nov. 19, 1999  (JP) .......................................... 11-330728

(51) Int. Cl.[7] .............................................. G06F 9/44
(52) U.S. Cl. ...................... 717/119; 717/149; 717/151; 718/1; 718/100
(58) Field of Search ................................. 717/119, 149, 717/140, 150–152, 154, 160, 106; 709/1, 100–108; 712/1, 245, 244

(56) References Cited

U.S. PATENT DOCUMENTS

| | | | | |
|---|---|---|---|---|
| 5,632,034 A | * | 5/1997 | O'Farrell | 717/140 |
| 5,724,565 A | * | 3/1998 | Dubey et al. | 712/245 |
| 5,742,822 A | * | 4/1998 | Motomura | 709/102 |
| 5,815,727 A | * | 9/1998 | Motomura | 712/1 |
| 5,828,880 A | * | 10/1998 | Hanko | 709/106 |
| 6,173,309 B1 | * | 1/2001 | Kirshenbaum et al. | 709/107 |
| 6,496,925 B1 | * | 12/2002 | Rodgers et al. | 712/244 |

OTHER PUBLICATIONS

Hu et al., OpenMP for Networks of SMPs, 1999, Department of Computer Science, Rice University, Houston, TX 77005.*

Sarkar, Analysis and Optimization of Explicitly Parallel Programs Using the Parallel Program Graph Representation, Nov. 1997, Laboratory for Computer Science, Massachusetts Institute of Technology.*

* cited by examiner

Primary Examiner—Antony Nguyen-Ba
(74) Attorney, Agent, or Firm—Staas & Halsey LLP

(57) ABSTRACT

An optimizing system, method and computer readable recording medium to increase the speed of parallel processing by allowing a mixture of automatic creation of parallel processes and OpenMP API processing and to prevent reduction in performance during parallel processing by controlling the generation of wasted threads when automatic parallel processing and OpenMP API call each other. The optimizing system, method and recording medium create object code that creates parallel processes from a source program coded in a specific programming language, wherein the program is performed using a plurality of threads. The optimizing system generates object code for a source program which is executed in parallel by generating a plurality of threads. The optimizing device includes a thread management system to store in a memory information regarding the respective threads created, a first parallel processing system to generate code to create a plurality of threads corresponding to notation in the source program for repetitive processes for which there is no instruction for the creation of parallel processes, and a second parallel process creation system to generate code to create threads after referencing information by the thread management system corresponding to the notation for processes for which parallel processing is specified in the source program.

21 Claims, 9 Drawing Sheets

```
1    INTEGER, PARAMETER::dim=2000000.0
2    REAL*8 area(dim*2)
3
4    CALL  aryset(area)
5    CALL  totl(area)
6  END
7
8  SUBROUTINE aryset(area)
9      INTEGER, PARAMETER::dim=2000000.0
10     REAL k(dim*2)
11     REAL*8 ly(dim*2) , sy(dim*2) , x(dim*2) , area(dim*2)
12     DO i=1, dim*2.0
13         k(i) = i
14         x(i) = -1.0+k(i)/dim - 1.0/(2.0*dim)
15         ly(i) = -x(i)+SQRT (1.0+x(i) *x(i))
16         sy(i) = -x(i)-SQRT (1.0-x(i) *x(i))
17         area(i) = (ly(i) - sy(i))*1.0/dim
18     END DO
19 END SUBROUTINE
20
21
22 SUBROUTINE totl(area)
23     INTEGER, PARAMETER::dim=2000000.0
24     REAL*8  area(dim*2)
25     REAL*8::aarea=0.0
26
27     DO i=1,dim*2
28          aarea=aarea+area(i)
29     END DO
30
31     WRITE(*,*)ttel
32 END SUBROUTINE
```

DO STATEMENT (1): lines 12–19

DO STATEMENT (2): lines 27–29

FIG. 3

```
 1    INTEGER, PARAMETER::dim=2000000.0
 2    REAL*8 area(dim*2)
 3
 4    CALL  aryset(area)
 5    CALL  totl(area)
 6  END
 7
 8  SUBROUTINE aryset(area)
 9      INTEGER, PARAMETER::dim=2000000.0
10      REAL k(dim*2)
11      REAL*8 ly(dim*2) , sy(dim*2) , x(dim*2) , area(dim*2)
12      DO i=1, dim*2.0
13          k(i) = i
14          x(i) = -1.0+k (i)/dim - 1.0/(2.0*dim)
15          ly(i) = -x(i)+SQRT (1.0+x(i) *x(i))
16          sy(i) = -x(i)-SQRT (1.0-x(i) *x(i))
17          area(i) = (ly(i) - sy(i))*1.0/dim
18      END DO
19  END SUBROUTINE
20
21
22  SUBROUTINE totl (area)
23      INTEGER, PARAMETER::dim=2000000.0
24      REAL*8  area(dim*2)
25      REAL*8::aarea=0.0
26      REAL*8::ttal=0.0
27      CALL OMP_SET_DYNAMIC(TRUE)
28
29      !$OMP PARALLEL PRIVATE(aarea)
30          aarea=0.0
31          !$OMP DO SCHEDULE(STATIC)
32          DO i=l, dim*2
33              aarea=aarea+area(i)
34          END DO
35          !$OMP END DO
36
37          !$OMP ATOMIC
38              ttal=ttal+aarea
39
40      !$OMP END PARALLEL
41
42      WRITE(*,*)ttel
43  END SUBROUTINE
```

DO STATEMENT (1) (AUTOMATIC CREATION OF PARALLEL PROCESSES) — lines 12–18

PARALLEL PROCESSING (SINGLE SHARED SPACE) — lines 12–18

DO STATEMENT (2) (OPENMP) — lines 29–40

INDEPENDENT PARALLEL PROCESSES (A SPACE FOR EACH THREAD) — lines 31–35

COLLECTION PROCESS — lines 37–38

FIG. 4

```
1    INTEGER, PARAMETER::dim=100
2    INTEGER*4 are(dim,dim)
3    INTEGER loop
4
5   !OCL INDEPENDENT (aryset)
6    DO j=I, 100
7        loop=j
8        CALL aryset(area,loop)
9    END DO
10 print*,area
11 END
12
13 SUBROUTINE aryset(area,loop)
14       INTEGER, PARAMETER::dim=100
15       INTEGER*4 are(dim,dim)
16       INTEGER loop
17
18       !SOMP PARALLEL
19           !SOMP DO SCHEDULE(DYNAMIC)
20           DO i=I, dim
21               area(loop,i)=i
22           END DO
23           !SOMP END DO
24       !SOMP END PARALLEL
25
26 END SUBROUTINE
```

Labels:
- DO STATEMENT (3) (AUTOMATIC CREATION OF PARALLEL PROCESSES) → lines 6–9
- PARALLEL PROCESSING (SINGLE SHARED SPACE) → lines 6–9
- DO STATEMENT (4) (OPENMP) → lines 18–24
- INDEPENDENT PARALLEL PROCESSES (CREATION OF NEW THREADS SUPPRESSED) → lines 18–24

FIG. 7

| THREAD NO. | TEAM ADDRESS | |
|---|---|---|
| 1 | — | |
| 2 | — | |
| 3 | — | |
| 4 | — | |
| | | |

(OFF:SET WHEN THE PARALLEL PROCESSING IS COMPLETED)

SYSTEM TO OPTIMALLY CREATE PARALLEL PROCESSES AND RECORDING MEDIUM

CROSS REFERENCE TO RELATED APPLICATIONS

This application is based upon and claims priority of Japanese Patent Application No. 11-330728, filed Nov. 19, 1999, the contents being incorporated herein by reference.

BACKGROUND OF THE INVENTION

1. Field of the Invention

The present invention relates to compiler which interprets a source program that is coded in a specific programming language and creates object code, and, more particularly, the present invention relates to a system for performing an optimized process wherein a compiler creates parallel processes for the processes that are coded in the source program.

2. Description of the Related Art

Conventional automatic parallel process creation methods create parallel processes for processes that are coded in a source program. The conventional automatic parallel process creation methods partition repeating ranges in the source program, such as those notated by DO statements, into, for example, four sections, and assign thread processes to each of the partitioned ranges. The individual thread processes are executed in parallel. The conventional types of automatic parallel process creation methods use the same space for each thread, and execute the threads in parallel.

Recently, the OpenMP Application Program Interface (API) has come into use. The OpenMP API (hereinafter referred to as OpenMP) can be used to execute independent processes in parallel because it is able to have each of the respective threads that are executed in parallel possess their own spaces.

When the conventional automatic parallel process creation method is used for parallel process creation on processes that are notated in the source program, the threads for each of the ranges that have been partitioned perform in parallel processes that all access the same space. Thus, the respective threads cannot access the shared space simultaneously so that the execution is like a sequential process in this part of the program, and a problem results in that the speed of execution is not adequately increased.

Furthermore, with respect to resources that have been automatically placed in parallel, compiled and executed in the past, all of these processes must be recompiled after correction of the programs to apply the new OpenMP. However, correcting all existing programs requires an extremely large amount of resources.

SUMMARY OF THE INVENTION

Because of the large amount of resources required to correct existing programs, the creation of full parallel processing for programs that have been placed in parallel and compiled in the past can be achieved by using the OpenMP only on those sections where parallel processing has not been possible, which is desirable because it achieves high-speed processing by furthering the parallel structures on only those parts that can be corrected easily.

The present invention solves the above-noted problems of the conventional automatic parallel process creation method by providing the easy creation of parallel processes through a combination of automatic creation of parallel processes and the OpenMP approach to speed up software execution.

Moreover, the present invention prevents reduction in performance during parallel processing by controlling the wasted creation of threads when processes mutually call each other.

The present invention provides a system to optimally perform parallel process creation with respect to a source program which executes a variety of processes. The system includes an optimizing device which performs optimizing, such as parallel processing, with respect to the parts of the source program that can be processed in parallel. The optimizing device comprises an analysis system and a parallel process creation system. The analysis system performs tasks, such as analyzing the source program and extracting the processes that can be placed in parallel. The parallel process creation system creates parallel processes for the processes extracted by the analysis system.

In operation, a first parallel process creation system generates code, which code creates a plurality of threads for the notation in the source program corresponding to repeating processes for which there is no instruction for the creation of parallel processes. A second parallel process creation system creates threads to reference information that is controlled relative to the notations of processes which have instructions for the creation of parallel processes. When the threads are created, the second parallel process creation system creates parallel processes using the OpenMP API.

The analysis system extracts information that calls the second parallel process creation system processes that can be put in parallel from the first parallel process creation system processes that can be put in parallel by analyzing the source program. When the parallel process creation system performs a process that transfers from the first parallel process creation system process that can be processed in parallel to the second parallel process creation system process that can be processed in parallel, a decision is made as to whether or not parallel processes have already been created. If parallel process have already been created, the creation of further parallel processes is prevented, and in those areas where parallel processes have already been created, the processes that create the threads for creating parallel processes are segmented into procedures and the appropriate code is generated. At this time, the notation is as per the second parallel process creation system that is notated using the OpenMP API.

In accordance with embodiments of the present invention, a computer readable recording medium implements with a computer a method of optimally creating parallel processes for a source program, the method comprising generating code to create a plurality of threads relative to repeating processes for which the source program does not include instructions for parallel processing; storing in a memory information regarding the respective threads created; and generating code to create threads that reference information controlled by the thread control management system for the threads, wherein information is stored in the memory relative to the respective threads created for the processes for which parallel processing is specified. The computer readable medium may be a hard drive or a removable storage medium.

In accordance with embodiments of the present invention, it is not only easily possible to speed up the creation of parallel processes by providing the combination of automatic parallel process creation and OpenMP, but it is also possible to prevent deterioration of performance during parallel processing by controlling the generation of wasted threads when parallel threads call each other.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 is an example of a program before corrections in accordance with embodiments of the present invention.

FIG. 4 is an example of a program after corrections in accordance with embodiments of the present invention.

FIG. 7 is an example of a program in accordance with embodiments of the present invention.

DESCRIPTION OF THE PREFERRED EMBODIMENTS

Figure 1:
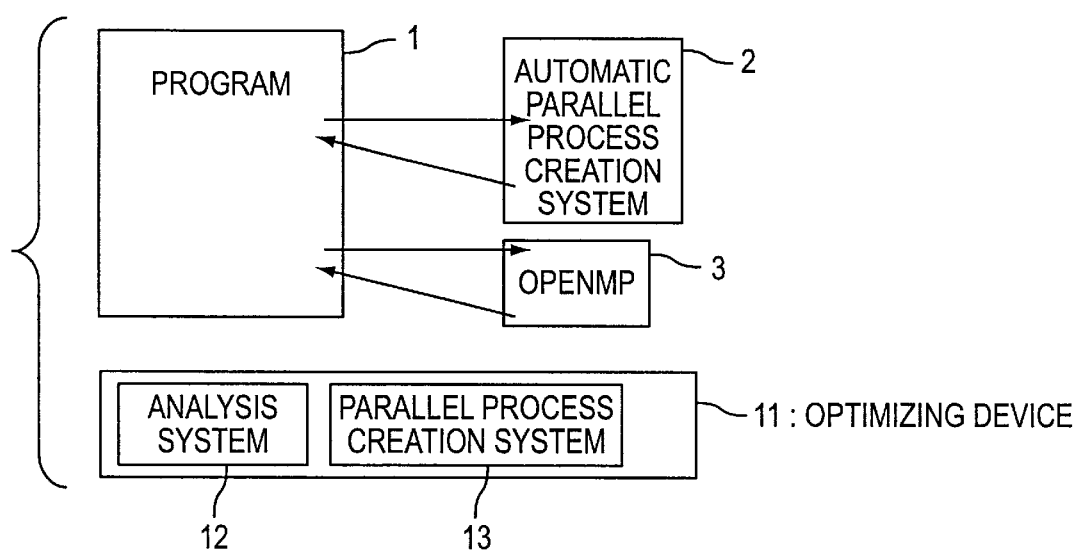
FIG. 1 is a block diagram of a system to optimally perform parallel processes creation in accordance with embodiments of the present invention.

Reference will now be made in detail to the preferred embodiments of the present invention, examples of which are illustrated in the accompanying drawings, wherein like reference numerals refer to like elements throughout.

A system to optimally perform automatic parallel process creation in accordance with embodiments of the present invention will be described below with reference to FIGS. 1–4.

FIG. 1 is a block diagram of a system to perform automatic parallel process creation in accordance with embodiments of the present invention. As shown in FIG. 1, a program 1 is the source program, such as, for example, the program shown in FIG. 3. The program 1 includes a section where parallel processing is possible, such as with a DO statement.

An automatic parallel process creation system 2 divides processes into multiple segments and then assigns these process parts to individual threads, after which the processes are performed in parallel. FIG. 1 illustrates schematically the situation where the automatic parallel process creation system 2 performs automatic parallel process creation for a section in the program 1 for which parallel processing is possible, and then parallel processing is performed.

OpenMP 3 illustrates schematically the status of parallel process execution using OpenMP for the processes in the program 1 that can be performed in parallel. The OpenMP 3 divides and assigns processes to respective threads following the OpenMP directives. These threads are each independent processes that can be executed in parallel. Furthermore, the partial processes that are assigned to each of the generated threads are simultaneously performed in parallel. Moreover, when necessary, the final process part gathers the data that is stored in the various thread spaces, for example, calculating the sum of the data from the spaces above, linking the partial arrays of the various spaces, creating an overall array, etc., to generate the results.

An optimizing device 11 optimizes the creation of parallel processes relative to the process parts of the program 1 for which parallel processing is possible. The optimizing device 11 comprises an analysis system 12 and a parallel process creation system 13. The analysis system 12 analyzes the program 1, performing both structural element analysis and syntactical analyses, etc., and extracts the partial processes that can be performed in parallel (for example, the DO statements, the OpenMP directives, etc) and performs other analyses.

The parallel process creation system 13 creates parallel processes for the partial processes that can be performed in parallel, which partial processes are extracted by the analysis system 12, as will be described in more detail hereinbelow with reference to FIG. 2.

Figure 2:
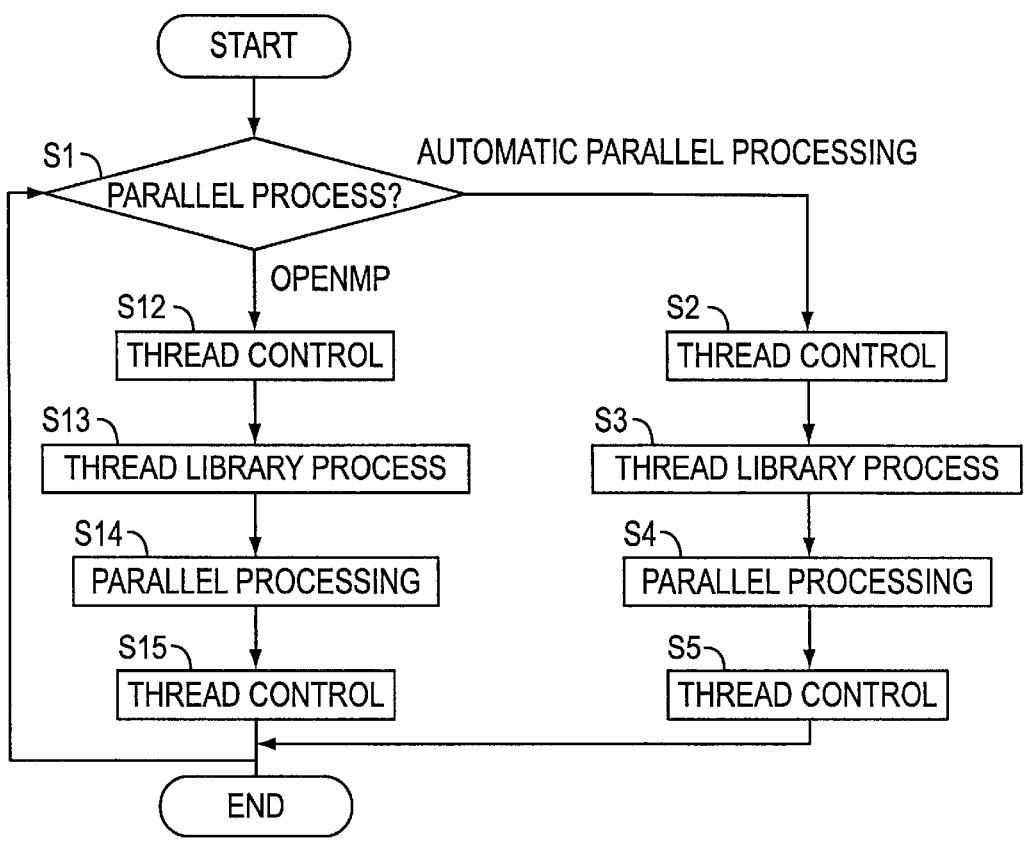
FIG. 2 is a flowchart of an operational process for performing parallel process creation in accordance with embodiments of the present invention.

FIG. 2 is a flowchart of an operational process for optimally performing parallel process creation in accordance with embodiments of the present invention.

As shown in FIG. 2, first, in operation S1, a determination is made as to whether a parallel process is an automatically created parallel process or an OpenMP. Operation S1 analyzes the source program 1 to determine whether the parallel process creation can be performed automatically, that is, whether automatic parallel process creation is specified, or whether the OpenMP is specified for the processes for which parallel processes are supported.

If operation S1 determines that the parallel process is an automatically created parallel process, the thread control is performed in operation S2. The thread control operation S2, for example, reads the current number of threads that have already been created and, based on the number of CPUs and the user instructions, determines the number of threads for which automatic parallel process creation is performed. For example, operation S2 may determine that four threads will be used for four parallel processes.

Next, in operation S3, thread library processing is performed wherein various processes are performed such as, when the number of threads determined by operation S2 is insufficient, using threads that have already been created but are not in use, or creating new threads.

Continuing, in operation S4, parallel processing is performed. More particularly, in operation S4, parallel processes are segmented and assigned to the threads (for example, four threads) which have been determined and prepared by operations S2 and S3. For example, in the DO statement (1) (FIG. 3), for which parallel processes can be automatically created in the program after the correction shown in FIG. 4, well-known automatic parallel process creation methods can be used to divide the process into four segments of, for example, array elements 1 through 200,000, as follows.

1 to 50,000

50,001 to 100,000

100,001 to 150,000

150,001 to 200,000

Then, the automatic parallel process creation system creates a library to perform the parallel processes that are assigned to the individual threads. Furthermore, the number of threads can be determined dynamically by the library based on the number of CPUs and on the user instructions.

In operation S5, thread control is performed. For example, operation S5 stores the number of threads that have been created and the number of threads in use. The above-described operations S2 through S5 are able to perform automatic creation of parallel processes in the parallel processing of the program in, for example, the DO statement (1) in FIG. 4. Moreover, at run time, it is possible to access the shared spaces for the various threads and to perform parallel processing, making it possible to increase the speed of processing.

When operation S1 determines that the parallel process is an OpenMP, the threads are controlled in operation S12. The thread control in operation S12 performs processes that, for example, read the number of threads that have been created and exist at any given time, determine the number of threads that are created automatically based on the number of CPUs and the user instructions, and determine the use of threads, for example, the four threads for the four parallel processes.

Operation S13 performs the thread library processes for the OpenMP. That is, when the number of threads determined is insufficient, operation S12 will use threads that have already been created but are not in use, or will create new threads. By rotating through the threads that are generated by OpenMP, the number of threads that are generated during execution can be reduced.

Operation S14 performs parallel processing. Operation S14 segments the parallel processes and assigns them to the threads that are determined and prepared by operations S12 and S13. For example, operation S14 segments the parallel processes and assigns them to the four threads. For example, in the DO statement (2) for which parallel processes can be created automatically in the program after correction shown in FIG. 4, the processes can be assigned to the four segments of array elements from 1 to 200,000 as follows:

1 to 50,000

50,001 to 100,000

100,001 to 150,000

150,001 to 200,000, where the various independent regions are accessed and a library for independent processing is created. Furthermore, the number of threads can be determined by the library based on the number of CPUs and user instructions at run time.

In operation S15, thread control is performed, storing the number of threads that have been created, the number of threads that have been used, etc.

Furthermore, when it is determined that the parallel process is OpenMP in operation S1, it has already been determined that the program correction will be performed. For example, for the DO statement (2), which is a parallel process in the source program shown in FIG. 3, there is no choice but to run sequentially, even if multiple threads are generated, because all of the threads access a single shared space. Thus, it is not possible to perform parallel processing using the automatic creation of parallel processes. However, in this case, it is possible to speed up the processing of the program by correcting the program through the application of OpenMP. For example, the DO statement (2) in FIG. 3 is corrected, such as shown in the DO statement (2) in FIG. 4. The DO statement (2) may be corrected either automatically or by the user. The correction uses the DO statement (2) shown in FIG. 4, and, as will be described in more detail below, maintains an independent space for each thread, assigns the partial processes to each thread and, in a correction to the program, performs a process to collect the results of the independent parallel processes of the various threads.

The above operations S12 through S15 make it possible to mix automatic creation of parallel processes with OpenMP within the program. Furthermore, it is possible to increase the speed of processing by collecting the results of the parallel processes by accessing the various independent spaces by the respective threads during execution.

FIG. 3 illustrates an example of a program prior to correction in accordance with embodiments of the present invention. The program example shown in FIG. 3 is a program which uses automatic parallel processing to calculate the area encompassed by the closed curve given by $Y^2=1-2x^2+2xy$, where the DO statement (1) (lines 12 through 18) can be processed faster through the automatic creation of parallel processes in the initiation of the array elements.

However, in DO statement (2) (lines 27 through 29), using automatic creation of parallel processes the variable space area is shared by the threads. Thus, there will be conflicts, making it necessary to process sequentially in this part of the program because the creation of an array is not possible.

FIG. 4 illustrates an example of a program after correction in accordance with embodiments of the present invention. As shown in FIG. 4, the section for the DO statement (2), for which the creation of parallel processes could not be performed using the automatic creation of parallel processes in the program shown in FIG. 3, is corrected so that parallel processing can be performed using OpenMP in the corrected program. The details of the correction involve rewriting the program so that independent spaces area are prepared for each thread, and the process is segmented to each of the respective threads in one part of the program. Then, a collection process is performed in the later half of the program so that the results of the independent parallel processes performed by the various threads are sequentially stored in the variable space area. For example, the various threads are summed or subjected to an array calculation where the respective parts are linked and stored as an overall result.

As seen in the program after correction shown in FIG. 4, the minimum requirement is for the DO statement (2) part to be rewritten to allow the DO statement (1) part to undergo automatic creation of parallel processes and the DO statement (2) part to have the creation of a library for the automatic execution of parallel processes using the OpenMP method. Thus, the automatic creation of parallel processes for the programs already existing as assets is mixed with the new OpenMP, making it possible to speed up processes by implementing parallel processing through only the least required number of corrections.

Figure 5:
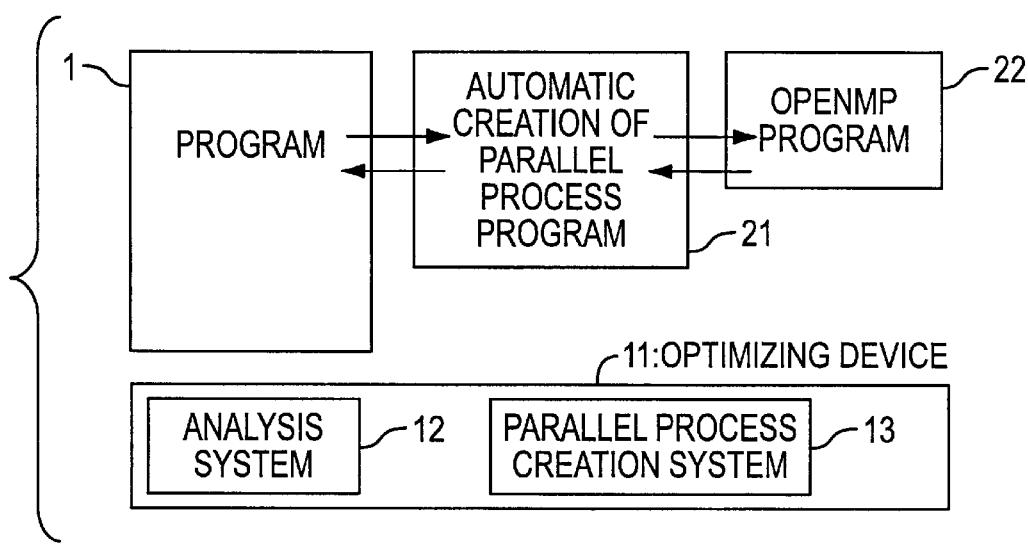
FIG. 5 is a block diagram of a system to optimally perform parallel process creation in accordance with embodiments of the present invention.

FIG. 5 is a block diagram of a system to perform optimal creation of parallel processes in accordance with a second embodiment of the present invention. In accordance with the embodiment shown in FIG. 5, when there is a call from an OpenMP program 22 or an automatic creation of parallel process program 21 to another program 21 having automatic creation of parallel processes or to another OpenMP program 22, threads are created and the number of CPUs is exceeded, which, conversely causes a reduction in processing capabilities. In accordance with the second embodiment shown in FIG. 5, the number of threads created is controlled, with a resulting improvement in processing capability.

As shown in FIG. 5, the optimizing device 11 performs optimizing by, for example, creating parallel processes for the parts of the program 1 where processing can be performed in parallel. The optimizing device 11 comprises an analysis system 12 and a parallel process creation system 13. The analysis system 12 analyzes the program 1 by performing structural element analyses, syntax analyses, etc., and extracts the parts of the program 1 that can be processed in parallel, for example, DO statements and OpenMP directives.

The parallel process creation system 13 creates parallel processes for the parts of the program 1 extracted by the analysis system 12 for which processing can be performed in parallel. When creating parallel processes, the parallel process creation system 13 performs various processes such as controlling the creation of new threads when there is a call to the automatic parallel process creation program 21 from the OpenMP program 22, or calls to the OpenMP program 22 from the automatic parallel process creation program 21. These processes will be described below with reference to FIGS. 6 through 9.

Figure 6:
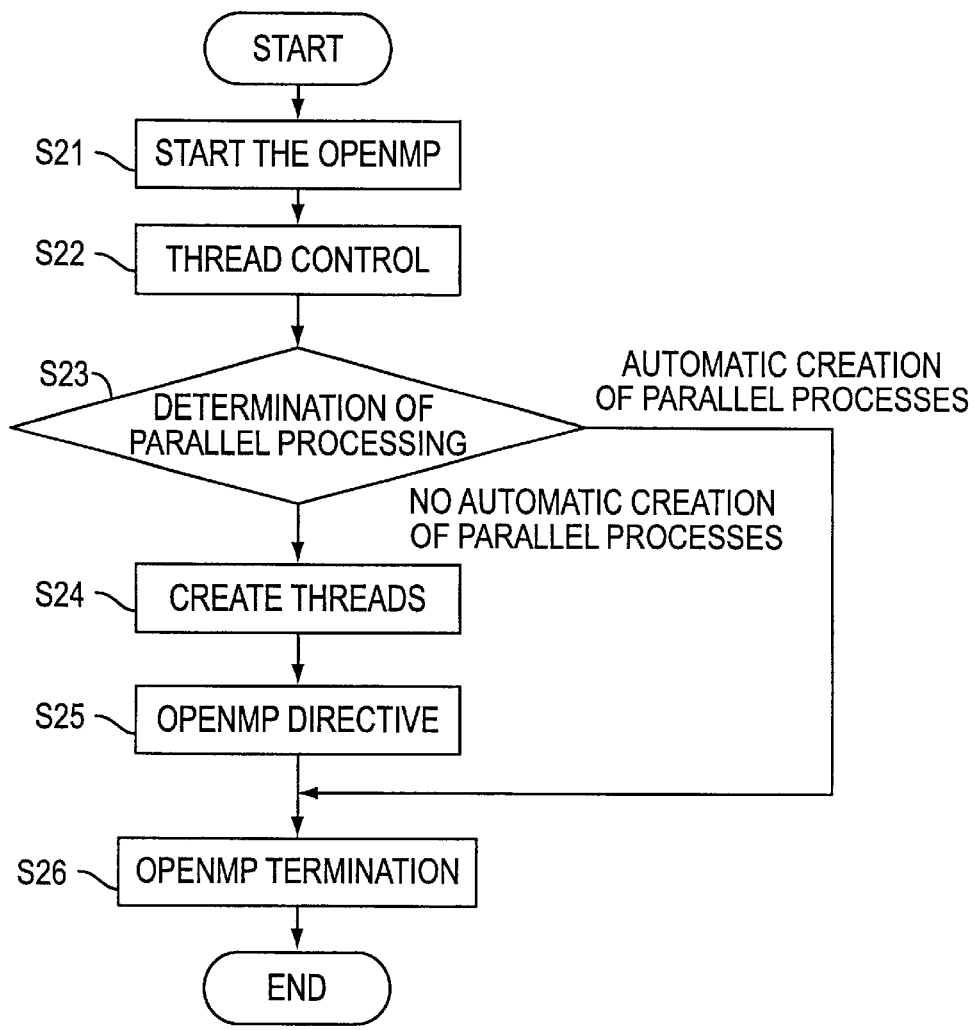
FIG. 6 is a flowchart of an operational process to optimally perform parallel process creation in accordance with embodiments of the present invention.
Figure 8:
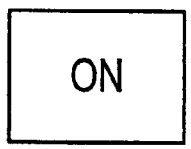
FIG. 8A is an example of a thread control table in accordance with embodiments of the present invention.
FIG. 8B is an example of a parallel flag in accordance with embodiments of the present invention.

The operation of the optimal parallel process creation system shown in FIG. 5 will now be described below with reference to the flowchart shown in FIG. 6. FIG. 6 is a flowchart illustrating an operational process to optimize parallel process creation in accordance with embodiments of the present invention.

As shown in FIG. 6, operation S21 starts the OpenMP program processing. In operation S21, when there is a call to the OpenMP program 22 from the automatic parallel process creation program 21, as shown in FIG. 5, the applicable OpenMP program 22 begins parallel processes. For example, as shown in FIG. 7, the OpenMP program calls the DO statement (4) (OpenMP) from the DO statement (3) (automatic creation of parallel processes) and starts the applicable DO statement (4) parallel processing.

Next, in operation S22, thread control is performed. The thread control, for example, reads the existing number of threads that have been created. Next, operation S23 determines whether there will be automatic creation of parallel processes during execution. For example, operation S23 will determine if the parallel flag and thread control table in FIG. 7 are referenced and parallel processes generated automatically (i.e., where there is a team address for the thread control table with the parallel flag ON), or if parallel processes will not be created automatically. The parallel flag and thread control table are controlled by the library, as will be described in more detail hereinafter. When it is determined that parallel processes will be created automatically, wasted threads are not generated, but rather the threads from the automatic creation of parallel processes immediately earlier are used for the applicable new OpenMP processing, at which time the operational process proceeds to operation S26. However, if the automatic creation of parallel processes will not be performed, the process proceeds to operation S24.

In operation S24, threads are generated because operation S23 determined that the automatic creation of parallel processes has not been performed. If there is an unused thread available at the time operation S22 is performed, then the thread is used for the automatic creation of parallel processes. Otherwise, a new thread is generated.

In operation S25, the OpenMP directives are performed. Specifically, in operation S25, parallel processes are partitioned to threads depending on the number of CPUs and user directions, and the processes are executed independently and in parallel. Operation S25 performs control processes, such as generating a given number of threads, assigning processes to the respective threads, executing the parallel and independent processes on the threads, etc., when the library is run. The OpenMP is exited in operation S26.

In accordance with the operations shown in FIG. 6, it is possible to increase the speed of processing by eliminating the overhead of the creation of unused threads by controlling the creation of parallel processes for the OpenMP that is called when parallel processes are generated automatically.

FIG. 7 illustrates an example of a program in accordance with embodiments of the present invention. More specifically, the program shown in FIG. 7 is an example of a program wherein there is a call from the automatic parallel process creation program 21 to the OpenMP program 22. The creation of threads in the OpenMP program 22 thus called is suppressed and the overhead required for, for example, the creation of applicable threads in excess of the number of CPUs, is eliminated. The program shown in FIG. 7 is an example of a program that is able to increase the speed of processing.

In FIG. 7, the DO statement (3) is a program to which the automatic creation of parallel processes is applicable. The DO statement (3) (automatic creation of parallel processes) calls the DO statement (4) (OpenMP). In the DO statement (4), parallel processes have already been created automatically in the DO statement (3) that was immediately before, and thus the program (statement) is applicable for suppressing the creation of new threads. The DO statement (4) performs the DO statement (4) processes with the threads that had been executed by the calling statement DO statement (3) as they are. Therefore, an increase in the number of threads is suppressed, and the number of threads generated does not exceed the number of CPUs. Thus, the problem of reducing the processing capability by parallel processing as a result of the amount of overhead required is solved.

FIGS. 8A and 8B are explanatory diagrams illustrating an example of the information controlled by the library in accordance with embodiments of the present invention. More particularly, FIG. 8A shows an example of a thread control table. The thread control table includes settings for team addresses corresponding to the threads that are created. The team addresses indicate the teams (groups) that perform the parallel process creation. For example, when four threads form a team, a 1 is placed in each applicable address column for thread numbers 1 through 4 and stored in memory. The thread control table makes it easily possible to determine if parallel processing is being performed. Moreover, if parallel processing is being performed, the thread control table makes it easy to determine how many threads have been created and are being used by which team (group).

FIG. 8B illustrates an example of a parallel flag in accordance with embodiments of the present invention. The parallel flag indicates the current parallel processing status. The flag is set to ON when the parallel processing begins, and is set to OFF when the parallel processing is completed. Referencing the flag makes it possible to determine the allocation of processes when threads are generated in response to the level of parallel processing of the threads at the given time (when the parallel flag is ON), and to discriminate between that and other states.

Figure 9:
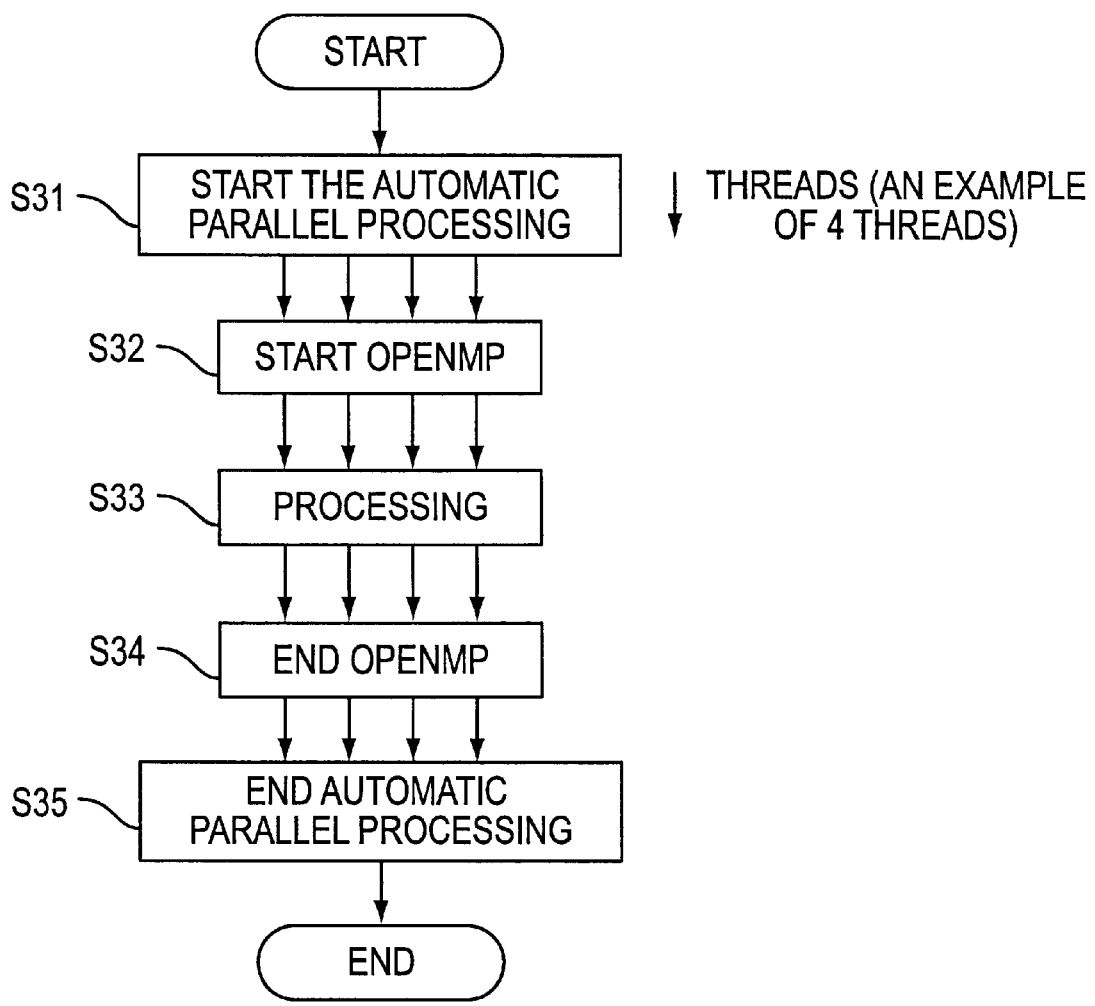
FIG. 9 is a flowchart illustrating processing execution in accordance with embodiments of the present invention.

FIG. 9 is a flowchart illustrating processing execution in accordance with embodiments of the present invention. More particularly, FIG. 9 shows, in an easily understood manner, a model of the situation wherein the automatic parallel process calls the OpenMP and performs processing, at which time the thread creation by the OpenMP that is called is suppressed, as described with respect to FIGS. 5 through 7, and wherein the threads from the original calling process perform the processes in the called process.

As shown in FIG. 9, in operation S31 an automatic parallel process is started. The process starts at the beginning of the program shown in FIG. 7, for example, when the processing starts with the DO statement (3) (automatic parallel processing). At this time, the DO statement (3) (automatic parallel processing) creates four threads through the library, as shown by the four arrow marks in FIG. 9 assigns processes and begins the parallel processing.

In operation S32, the OpenMP process is started. The process that is started by operation S32 is, for example, the DO statement (4) (OpenMP) that is called in the DO statement (3) in the automatic parallel processing in FIG. 7.

In operation S33, processing is performed. Operations S32 and S33 have already determined the generation of parallel processes when, for example, the DO statement (4) in FIG. 7 is started. Therefore, the creation of threads for the DO statement (4) (OpenMP) is suppressed, and the threads that performed the DO statement (3) (automatic parallel processing) immediately preceding the DO statement (4) are used for executing the applicable DO statement (4). Thus, the number of threads (indicated by the arrow marks) remains at four. Conventionally, the threads would not be suppressed by the DO statement (4), and a total of sixteen (16) threads would be generated.

Operation S34 is the OpenMP termination. This is, for example, the end of the DO statement (4) process in FIG. 7. Finally, in operation S35, the parallel processing flag is set to OFF, and the automatic parallel processing is terminated.

As described above, when the OpenMP is called from the automatic parallel processing, the creation of threads in the called process is suppressed, and the processing is continued using the threads that existed immediately previous to the call. Thus, the number of threads created does not grow too large so that it exceeds the number of CPUs, making it possible to solve the problem of performance reduction as a result of parallel processing because of the overhead involved with the creation of threads.

Furthermore, in the above-described embodiments, an example was described wherein the OpenMP is called during parallel processing. However, the creation of threads is also suppressed when the automatic parallel processing is called from the OpenMP. Thus, it is possible to solve the problem of reduced performance during parallel processing as a result of the overhead accompanying the creation of threads by eliminating the creation of too many threads, exceeding the number of CPUs.

As described above, in accordance with embodiments of the present invention, the speed of parallel processing is increased by permitting the creation of parallel processes where processes that can be run in parallel are assigned to threads that are created (such as in the creation of automatic parallel processes) to be mixed with parallel processing using OpenMP written in the program. Further, it is also possible to prevent reduction in performance during parallel processing by suppressing the creation of wasted threads when the automatic parallel process and the OpenMP call each other, and by having the automatic parallel process and the OpenMP use each other's threads.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An optimizing device to generate object code for a source program which is executed in parallel by generating a plurality of threads, comprising:
   a thread management system to store, in a memory, information regarding the respective threads generated;
   a first parallel process creation system to generate code to create respective ones of the plurality of threads corresponding to repeating processes that are not specified as parallel in the source program; and
   a second parallel process creation system to generate code to create other respective ones of the plurality of threads that reference information controlled by the thread management system relative to processes for which parallel processing is specified in the source program.

2. An optimizing device as recited in claim 1, wherein the second parallel process creation system creates parallel processes with an OpenMP application program interface.

3. An optimizing device to generate object code for a source program which is executed in parallel by generating a plurality of threads, the optimizing device comprising:
   an analysis system to analyze the source program and to extract information that calls a second parallel process from a first parallel process; and
   a determination system to determine from the first parallel process whether further parallelism is achievable when performing processes after the second parallel process is called, to generate code to suppress further creation of parallel processes when parallel processes have already been created, and to assign processes by generating threads for parallel processing when processes have not already been created.

4. An optimizing device as recited in claim 3, wherein the second parallel process uses an OpenMP application program interface.

5. An optimizing device to generate object code for a source program which is executed in parallel by generating a plurality of threads, comprising:
   a first parallel process creation system to create respective ones of the plurality of threads relative to repeating processes for which the source program does not include instructions for parallel processing;
   a thread management system to store, in a memory, information regarding the respective threads created; and
   a second parallel process creation system to create other respective ones of the plurality of threads that reference information controlled by the thread management system for the threads,
   wherein information is stored in the memory relative to the respective threads created for the processes for which parallel processing is specified.

6. An optimizing device as recited in claim 5, wherein the second parallel process creation system creates parallel processes with an OpenMP application program interface.

7. A computer readable recording medium to implement with a computer a method of optimally creating parallel processes for a source program, the method comprising:
   generating code to create a plurality of threads relative to repeating processes for which the source program does not include instructions for parallel processing;
   storing in a memory information regarding the respective threads created; and
   generating code to create other threads that reference information controlled by a thread control management system for the threads, wherein information is stored in the memory relative to the respective threads created for the processes for which parallel processing is specified.

8. A device to create parallel processes for a source program, comprising:

a first parallel process creation system to generate first parallel processes for first portions of the source program;

a second parallel process creation system, different from the first parallel process creation system, to generate second parallel processes for second portions of the source program; and an optimizing device to optimize a generation of the first and second parallel processes with respect to the source program by using the first parallel process creation system and the second parallel process creation system.

9. A device to create parallel processes for a source program, as recited in claim 8, wherein the first parallel process creation system creates the first parallel processes using an automatic creation of parallel processes, and the second parallel process creation system creates the second parallel processes using an OpenMP application program interface.

10. A device to create parallel processes for a source program as recited in claim 8, wherein the optimizing device comprises:

an analysis system to analyze the source program and to extract partial processes which are performable in parallel; and a parallel process creation system to create parallel processes from the partial processes extracted by the analysis system.

11. A device to create parallel processes for a source program as recited in claim 10, wherein the analysis system analyzes the source program to determine for each of the extracted partial processes whether parallel process creation is automatically performable or whether an OpenMP application program interface is specified.

12. A device to create parallel processes for a source program as recited in claim 10, wherein the parallel process creation system determines a number of threads that will be used for parallel processes and creates a thread library storing information related to the threads.

13. A system to create parallel processes when a first parallel process calls a second parallel process, comprising:

an analysis system to determine whether the first parallel process calls the second parallel process; and a parallel process creation system to control a creation of new threads in the second parallel process in response to determining that the first parallel process calls the second parallel process.

14. A system to create parallel processes as recited in claim 13, wherein the parallel process creation system suppresses generation of threads by the second parallel process and uses threads created by the first parallel process in the second parallel process.

15. A system to create parallel processes as recited in claim 14, wherein the first parallel process uses an automatic creation of parallel processes and the second parallel process uses an OpenMP application program interface.

16. A system to create parallel processes as recited in claim 14, wherein the first parallel process uses an OpenMP application program interface and the second parallel process uses an automatic creation of parallel processes.

17. A system to create parallel processes as recited in claim 13, wherein the parallel process creation system creates the new threads for the second parallel process when the first parallel process has not generated threads.

18. A system to create parallel processes as recited in claim 13, further comprising a thread management system to provide an indication of an allocation of processes to threads.

19. An optimizing device, comprising:

a thread management system to store, in a memory, information regarding a plurality of generated threads;

a first parallel process creation system to generate a first portion of object code from a source program to create respective ones of the plurality of threads corresponding to repeating processes that are not specified as parallel in the source program; and a second parallel process creation system to generate a second portion of the object code from the source program to create other respective ones of the plurality of threads that reference information controlled by the thread management system relative to processes for which parallel processing is specified in the source program, the first and second portions of object code being executed in parallel by the plurality of threads.

20. A method of optimally creating parallel processes from a source program, comprising:

generating code to create a plurality of threads, the plurality of threads, respectively, being created relative to repeating processes for which the source program does not include instructions for parallel processing or being created such that the respective threads reference information controlled by a thread control management system; and storing in a memory information regarding the respective threads created for the processes for which parallel processing is specified.

21. A method of optimally creating parallel processes for a source program, the method comprising:

generating code to create a plurality of threads relative to repeating processes for which the source program does not include instructions for parallel processing;

storing in a memory information regarding the respective threads created; and generating code to create other threads that reference information controlled by a thread control management system for the threads, wherein information is stored in the memory relative to the respective threads created for the processes for which parallel processing is specified.

* * * * *